United States Patent [19]

Buckner et al.

[11] 4,211,130

[45] Jul. 8, 1980

[54] METHOD AND APPARATUS FOR HANDLING AND STACKING BRICK

[76] Inventors: John G. Buckner, Rte. 2, Box 83, Ramseur, N.C. 27315; Cletus E. Lineberry, Rte. 1, Box 106, Staley, N.C. 27355; Jimmy W. Harris, 618 Circle Dr., Siler City, N.C. 27344

[21] Appl. No.: 954,997

[22] Filed: Oct. 26, 1978

[51] Int. Cl.² .............................................. B28B 11/14
[52] U.S. Cl. ............................................ 83/23; 83/86; 83/90; 83/651.1; 198/374; 414/56; 414/95
[58] Field of Search ............... 198/422, 374; 414/786, 414/33, 55, 56, 95; 83/23, 86, 90, 651.1

[56] References Cited

U.S. PATENT DOCUMENTS

| | | | |
|---|---|---|---|
| Re. 28,160 | 9/1974 | Lingl | 414/56 X |
| 3,589,495 | 6/1971 | Pearne | 414/56 X |
| 3,667,622 | 6/1972 | Kamphues | 414/56 |

*Primary Examiner*—J. M. Meister
*Attorney, Agent, or Firm*—Mills & Coats

[57] ABSTRACT

The present invention relates to a method and apparatus for cutting, grouping and stacking brick wherein after cutting and grouping, selected courses are inverted and stacked on other uninverted courses to form two course high stacks with the respective bricks being stacked face to face in order to assure uniform face color after the bricks have been cured and dried. As a part of the method, rows of single course cut brick are accumulated on a receiving table after exiting from a brick cutting assembly, and selected bricks are transferred from the receiving table to an inverter where they are inverted and deposited back on a course of single high uninverted brick to form a two course stack with the respective bricks being stacked face to face. The formed two course high stack is then transferred to where the same is ultimately loaded onto a kiln car for curing and drying.

9 Claims, 11 Drawing Figures

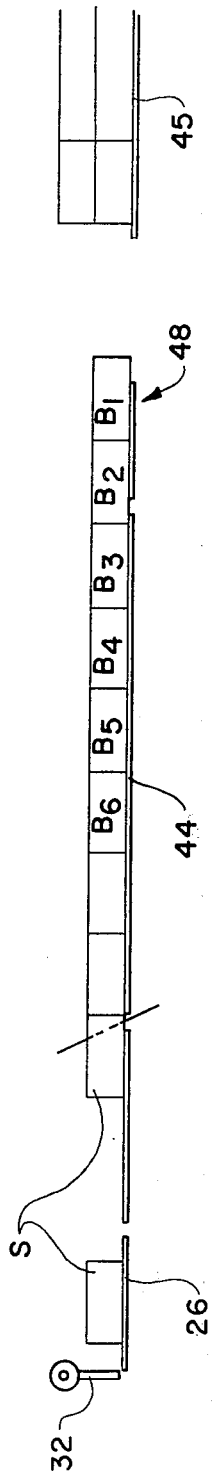
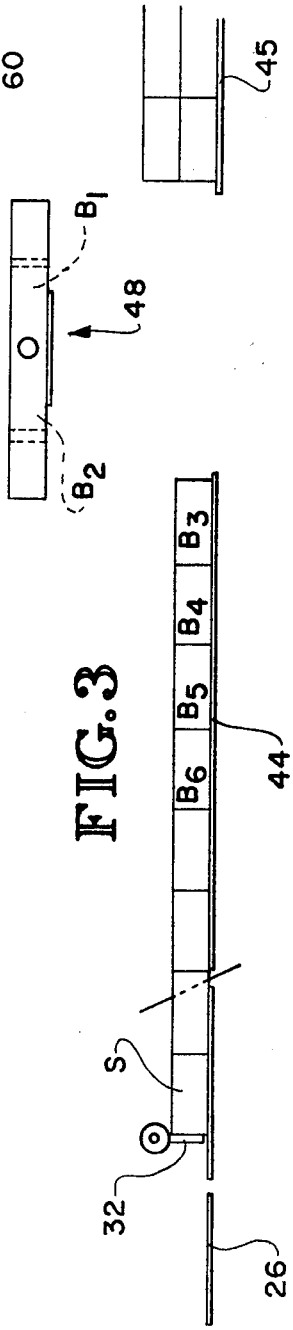
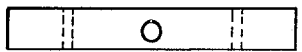
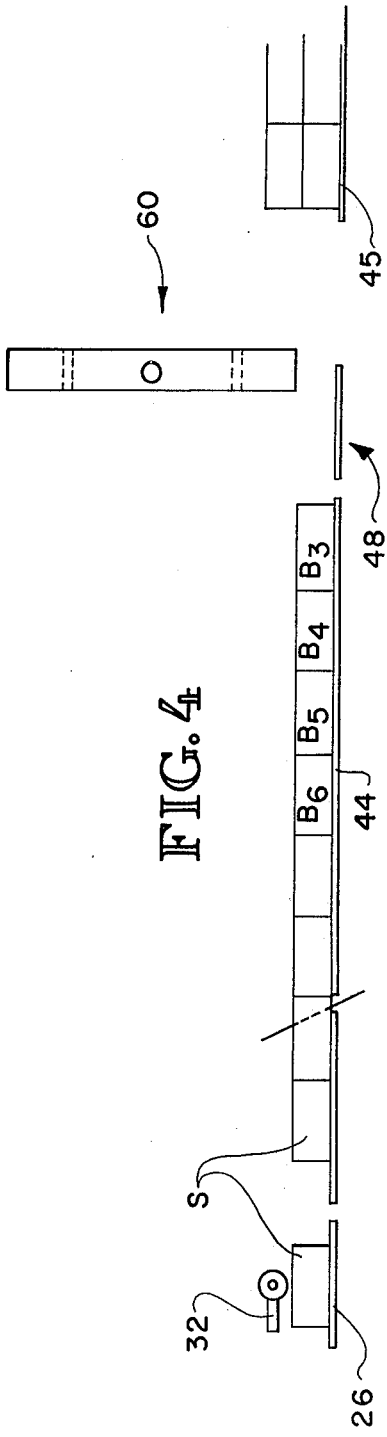

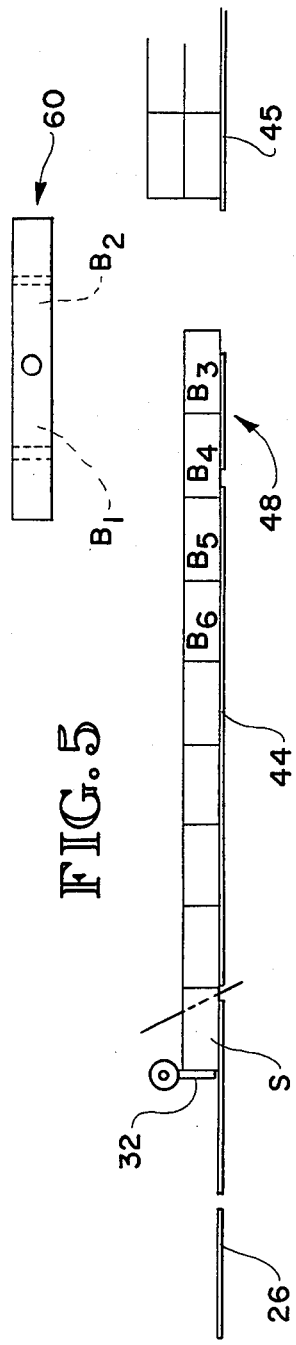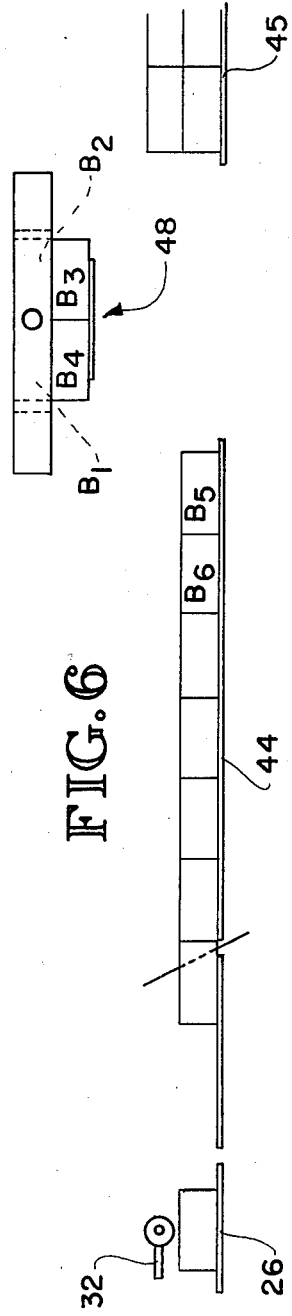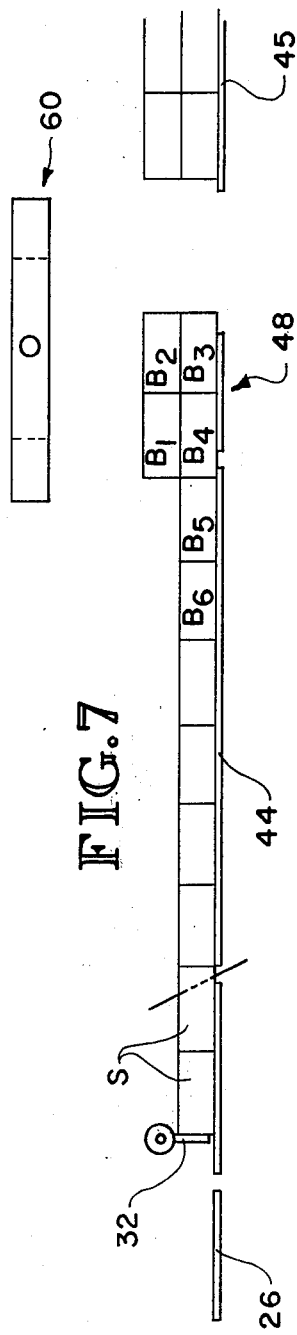

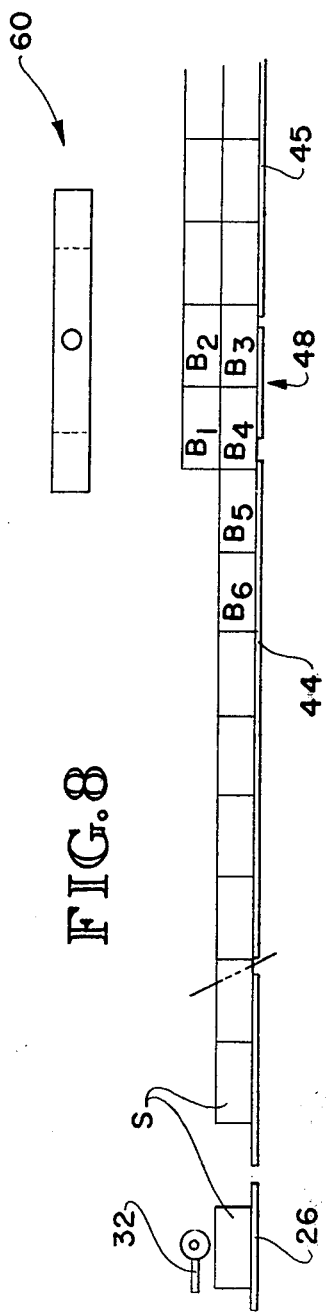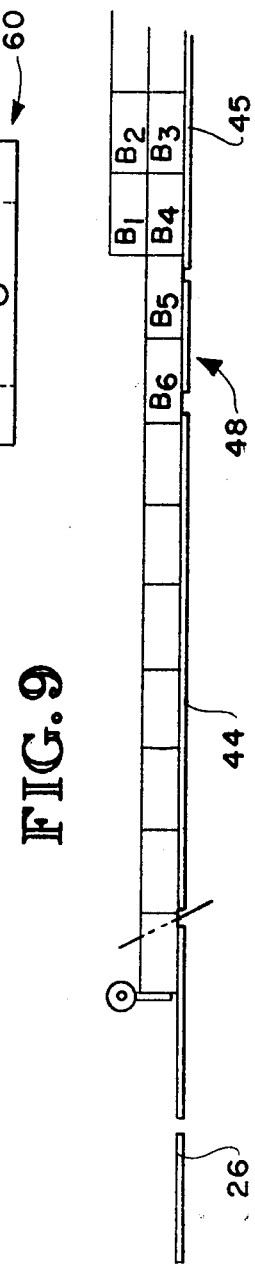
FIG. 8
FIG. 9

METHOD AND APPARATUS FOR HANDLING AND STACKING BRICK

The present invention relates to material handling, and more particularly to a method and apparatus for handling and stacking brick wherein subsequent to cutting and grouping the bricks are stacked in double course high stacks and by inverting the top course the bricks comprising the stack are disposed in face to face relationship.

BACKGROUND OF THE INVENTION

In producing brick, it is customary to cut brick slugs into individual bricks and then through a setting operation to stack the bricks on a kiln car for curing and drying. A setter assembly, such as disclosed in U.S. Pat. No. 3,589,495 is typically used to transfer bricks to a kiln car that transfers the brick through curing and drying kilns. For efficiency and effective curing and drying, the setter assembly stacks the bricks in a spreaded stack pattern in order that drying air can reach the bricks within the stack, especially the bricks disposed within the interior and central area of the stack, through the spaces between respective bricks resulting from the spreaded stack pattern. With the spreaded stack pattern and the fact that alternating pairs of courses may be crossed to tie the stack, certain edge portions of the brick are exposed while other edge portions of the same edge may not be exposed. This often results in streaked and nonuniform coloration of such edges that are partly exposed and partly unexposed.

To correct this problem, every other course of the stack can be inverted such that the bricks comprising a pair of courses can be stacked in vertical alignment face to face. In such a case, the face of each brick lies adjacent and in abutting relationship with the face of another brick in an adjacent course, consequently all of the faces are covered so as to yield a uniform color for the entire face of all of the bricks.

Inverting has been known in the brick industry heretofore. For example, in U.S. Pat. No. 3,589,495, an inverter is utilized therein prior to the hacking operation to stack two slugs, one on top of another in face to face relationship. Inverting and stacking slugs prior to cutting is not conducive to a high and efficient brick producing operation, and consequently such is not deemed to be a desirable brick producing method. This is because the essential problem is that it is difficult to cut and stack slugs sufficiently fast enough to carry out an efficient and high brick production operation.

Moreover, in certain cases, it is desired to texturize the face of the bricks, and texturizing for best results should only be done after cutting. Thus, where texturizing is desired, there is a need for double course stacking subsequent to cutting with the provision that every other course be inverted to allow double course face to face stacking on the kiln cars to assure uniform face coloration.

SUMMARY OF THE INVENTION

The present invention entails a method and apparatus for the double course face to face stacking of bricks after cutting and prior to setting. More particularly, the apparatus of the present invention comprises a receiving table for receiving a plurality of rows of cut brick, one behind another, that are pushed through and from a wire bank brick cutter. Adjacently mounted to the receiving table is an elevator assembly that receives a selected one course of brick from said receiving table and transfers the same to an upwardly disposed inverter which inverts the course of brick. Once the elevator assembly has transferred the first one course of bricks to the inverter, the same returns to the receiving table and receives a second single course of bricks and returns to the inverter where the first single course of bricks is deposited on top of the second single course of bricks to form a double course stack of bricks, stacked face to face.

This double course of face to face stacked brick is then transferred from the elevator assembly to where the same double course stack is engaged by a conventional setter assembly and transferred to a kiln car for curing and drying.

It is, therefore, an object of the present invention to provide an efficient and effective method and apparatus for double course, face to face stacking of brick subsequent to cutting and prior to setting.

Another object of the present invention is to provide a method of brick production that entails double course stacking but which is capable of texturizing the faces of brick prior to the double course stacking operation.

A further object of the present invention is to provide a high capacity cooperative elevator and inverter assembly that is capable of handling, inverting and stacking groups of individual cut bricks.

Other objects and advantages of the present invention will become apparent from a study of the following description and the accompanying drawings which are merely illustrative of the present invention.

BRIEF DESCRIPTION OF DRAWINGS

FIG. 2 is a first sequence view illustrating the stacking method of the present invention;

FIG. 3 is another sequence view illustrating the elevator in its uppermost position adjacent the inverter;

FIG. 4 is still another sequence view with the elevator assembly in a downward position and the inverter being rotated;

FIG. 5 is still another sequence view with the elevator table receiving another course of bricks;

FIG. 6 is another sequence view with the elevator table and the other course of bricks being raised to an upper position;

FIG. 7 is still another sequence view with the elevator assembly being raised to the lower position with the first course of bricks and the second course of bricks being supported thereon;

FIG. 8 is another sequence view illustrating the manner of preparing to transfer the two course high brick stack from the elevator assembly to an adjacent transfer table;

FIG. 9 is the last sequence view illustrating the transfer of the two course brick stack from the elevator assembly onto an adjacent transfer table.

BRICK HANDLING AND STACKING METHOD AND APPARATUS

Figure 1:
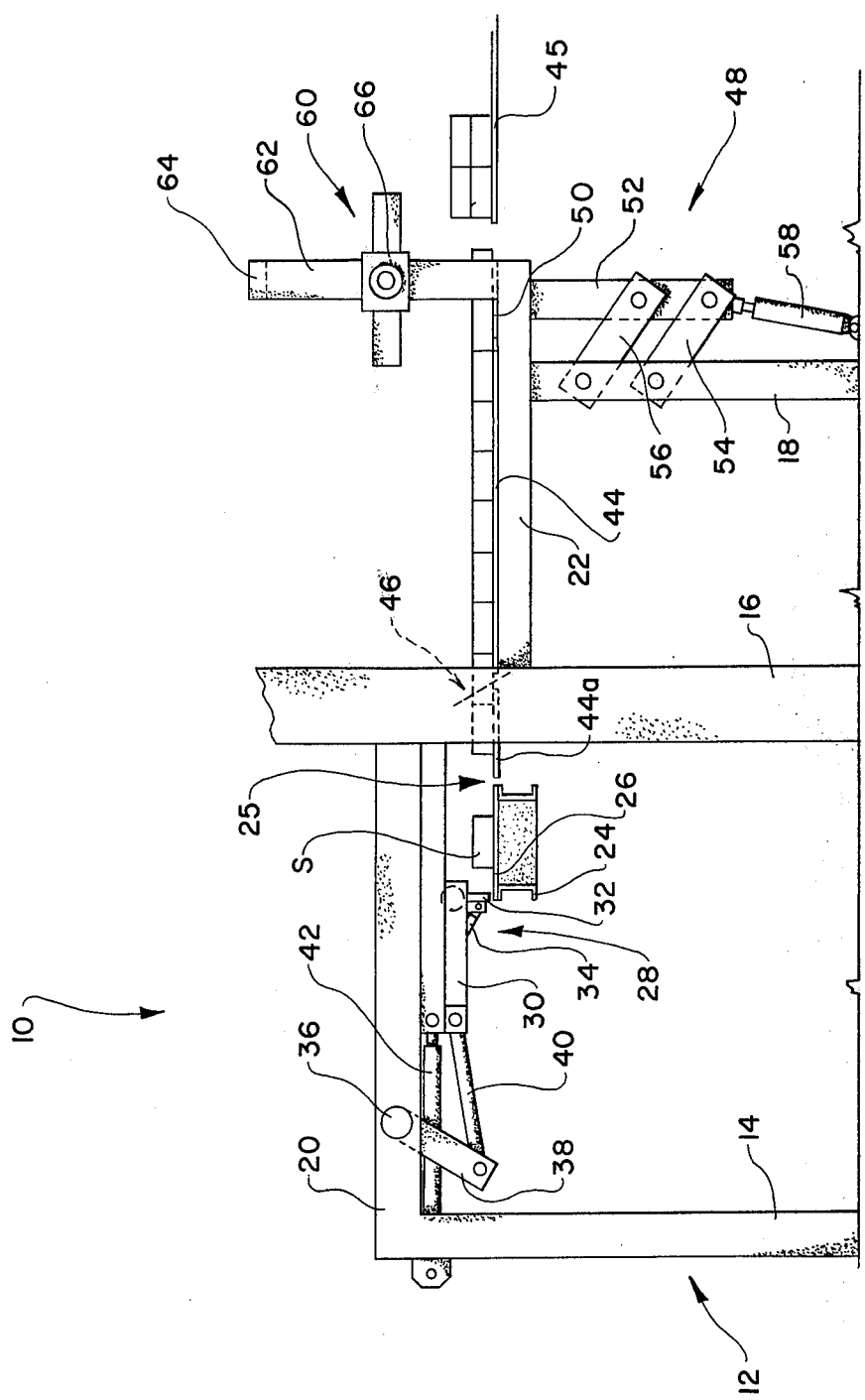
FIG. 1 is a side elevational view of the brick handling and stacking apparatus of the present invention.

With further reference to the drawings, particularly FIG. 1, the brick handling and stacking apparatus of the present invention is shown therein and indicated generally by the numeral 10. Viewing the apparatus 10 in detail, it is seen that the same comprises a main frame structure, indicated generally by the numeral 12 including a series of upright support posts comprised of a pair of ends 14, a pair of intermediate post 16, and a pair of upright post 18 disposed to the right of intermediate post 16 (only one of each pair of posts being shown since the apparatus is shown from a side elevational view). Supported horizontally above the posts 14, 16, and 18 is two horizontal frame assemblies 20 and 22.

For conveying slugs of brick material S to apparatus 10, there is provided a conveyor frame 24 that supports an endless driven off bearing belt 26 that in turn supports the respective brick slugs S thereon. Although only a portion of the off bearing belt 26 and associated assembly is shown, it is appreciated that the same extends underneath main frame structure 12, as shown in FIG. 1, and includes a stop (not shown) that is adapted to stop respective brick slugs at a discharge area denoted by the numeral 25 below horizontal frame assembly 20.

Disposed to the left of the off bearing belt 26 and associated structure is a slug pusher means, indicated generally by the numeral 28 that is reciprocally mounted within the frame structure 12 and which is adapted to push respective slugs S from the off bearing belt towards the right as viewed in FIG. 1. Viewing pusher means 28 in detail, it is seen that the same includes a reciprocally mounted carriage 30 that is supported within a formed guide rail structure forming a part of the horizontal frame assembly 20. Transversely mounted within carriage 30 is a pusher bar 32 that is rotatively mounted about a transverse axis within carriage 30 and is adapted to be actuated between a down position (FIG. 1) and a retracted position by hydraulic cylinder means 34 operatively interconnected between carriage 30 and pusher bar 32. In the retracted position, the pusher bar 32 would assume a generally horizontal position and would assume an elevation sufficient to clear a brick slug S extending into the discharge area as the carriage would return to its home position, that position being assumed in FIG. 1 to the left of the off bearing belt 26 and associated assembly.

In addition, there is provided a linkage mechanism for guiding the carriage 30 back and forth during the brick producing operation. The linkage mechanism comprises a torsion bar 36 rotatively journaled transversely within horizontal frame assembly 20 and having a pair of actuating links 38 secured thereto and movable therewith. Pivotably connected to the remote end of links 38 are a pair of corresponding connecting links 40 that extends from links 38 to where they are connected to carriage 30. For actuating the entire carriage 30 and pusher means 28, there is provided hydraulic cylinder means that is anchored to the main frame structure 12 and extends therefrom where the same is connected to carriage 30. Thus, it is appreciated that the extension and retraction of the hydraulic cylinder means 42 results in the carriage 30 being reciprocally driven first left to right, and then right to left, so as to engage a respective slug S disposed on the off bearing belt 26 and to push the same towards the right, as viewed in FIG. 1. It is appreciated that the actuating of hydraulic cylinder means 34 would be controlled in time relationship to the actuation of hydraulic cylinder means 42 and the movement of carriage 30 such that the pusher bar 32 would be retracted for the return stroke of the carriage such that the pusher bar 32 would not interfere with a succeeding slug S.

Disposed to the right of the off bearing belt 26 and generally horizontally aligned therewith is a receiving table 44 that is supported above the horizontal frame assembly 22 and is consequently supported by the main frame structure 12 of apparatus 10. Receiving table 44 includes a receiving table extension 44a that lies closely adjacent off bearing belt 26 for receiving respective slugs S pushed therefrom. Situated between receiving table 44 and extension 44a is a conventional wire bank cutting assembly, indicated generally by the numeral 46. It is appreciated that as the slugs S are pushed from the off bearing belt 26 onto extension 44a, and on through the wire bank cutting assembly 46, that each individual slug S is cut into a row of individual bricks. In addition, during the brick hacking operation, the cut brick are allowed to accumulate on receiving table 44 and are advanced thereacross, left to right, as viewed in FIG. 1 where the respective rows of cut brick are transversely aligned and follow one after another.

Situated about the right terminal end of receiving table 44 is an elevator assembly indicated generally by the numeral 48. Elevator assembly 48 includes a generally horizontal, transversely extending receiving bed 50 that normally assumes a receiving position aligned with receiving table 44. Secured to receiving bed 50 and extending generally downwardly therefrom is a pair of vertical support posts 52 that are guided and maintained in a pair of proper alignment by corresponding pairs of guide links 54 and 56. Although only one pair of guide links 54 and 56 are shown, it is appreciated that there would be a corresponding pair operatively interconnected between the post 18 about the opposite side and a corresponding vertical support post 52. To actuate elevator assembly 48, there is provided hydraulic cylinder means 58 that could be anchored to the floor or to an appropriate part of the main frame structure 12, and which would extend therefrom to where the same would operatively connect to the lower portion of the elevator assembly 48 so as to actuate the same between a first position, shown in FIG. 1, and a second raised or elevated position.

Disposed above the elevator assembly 48 is an inverter, indicated generally by the numeral 60. Inverter 60 is supported by a support frame assembly including a pair of laterally spaced vertical posts 62 that extends upwardly from the horizontal frame assembly 22 and includes a cross member 64 extending thereacross. Inverter 60 is rotatively journaled between post 62 and can be rotatively driven thereabout by a conventional hydraulic rack and pinion rotary drive unit indicated by numeral 66.

Figure 10:
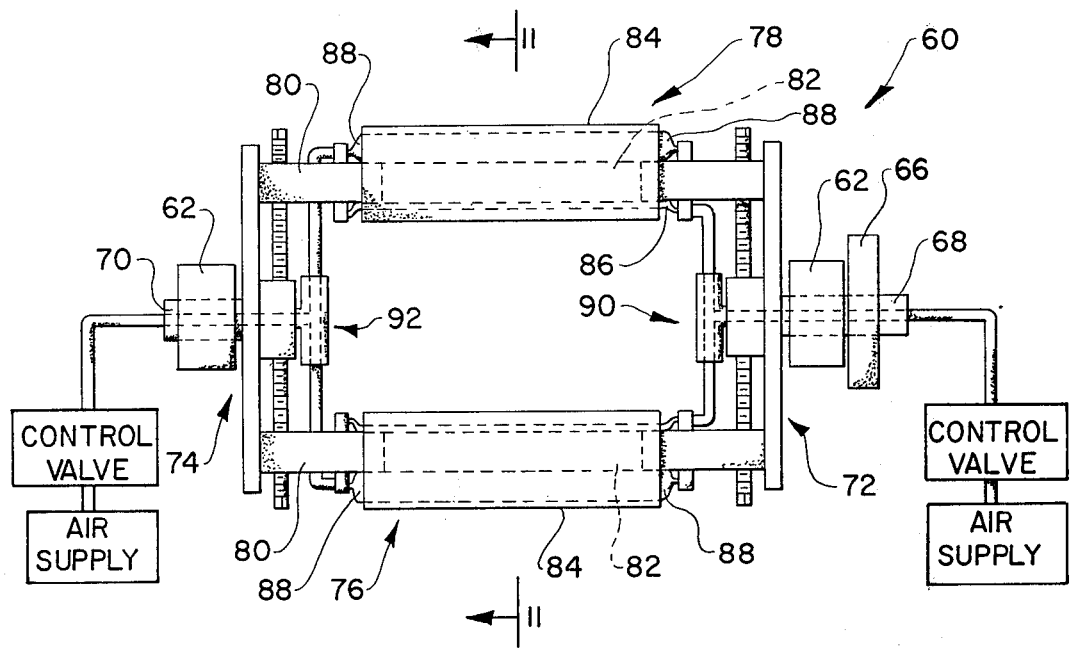
FIG. 10 is a plan view of the inverter.
Figure 11:
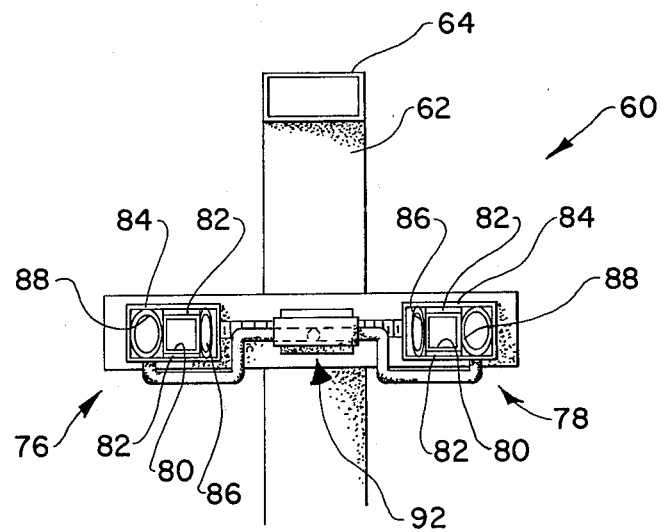
FIG. 11 is a sectional view of the inverter taken through the lines 11—11 of FIG. 10.

Turning to FIGS. 10 and 11, the basic structure of the inverter 60 is illustrated therein. In particular, it is seen that the inverter 60 includes a pair of shafts 68 and 70 that are adapted to be rotatively journaled transversely within support posts 62. Rigidly secured to shafts 68 and 70 are a pair of laterally spaced apart side carrier frame assemblies 72 and 74, respectively. Each side carrier frame assembly includes a series of adjustable plates that allows the effective gripping distance of the inverter 60 to be adjusted to accommodate various size bricks.

Operatively connected between the side carrier frame assemblies 72 and 74 are a pair of opposed pusher assemblies, indicated generally by the numeral 76 and 78. Each pusher assembly 76 or 78 includes a central stabilizer tube 80 that is secured transversely between the side carrier frame assemblies 72 and 74. Disposed about opposed sides of the central stabilizer 80 is a bearing surface 82 that enables a pusher or gripper tube 84 that snugly surrounds the stabilizer 80 and bearing surface 82 to slide fore-and-aftly thereacross. It is appreciated, as viewed in FIG. 10, that the pusher members 84 are generally aligned and spaced apart so as to define a space therebetween for engaging and holding at least a single course of bricks (typically two rows) therebetween. To actuate the respective pusher assemblies 76 and 78, there is provided about the inboard side of each an inflatable bladder 86 (such as a fire hose) and about the outboard side a like inflatable bladder 88. It is appreciated that in both cases that the bladders 86 and 88 extend between an outer side wall structure of the pusher 84 and the central stabilizer 80, as best seen in FIG. 10. Consequently, if the inboard bladder 86 is inflated, it is appreciated that the entire pusher 84 is caused to move inwardly, and when both pushers 84 are simultaneously actuated by inflating the inboard bladders 86, it is appreciated that the two pushers 84 will cooperate to grip a course of brick therebetween. To release the same course of brick, the actuation of the outboard of bladder 88 by inflating the same will result in the respective pusher 84 being moved outwardly with respect to the central stabilizer 80 so as to release any bricks being held by the pushers 84.

In this preferred embodiment illustrated in FIGS. 10 and 11, the inverter is pneumatically actuated and to accomplish this there is provided a gripper pneumatic inlet control sub-assembly indicated generally by the numeral 90, and a release pneumatic inlet control sub-assembly indicated generally by the numeral 92. In the case of the gripper inlet control sub-assembly 90, the same is adapted to receive air from an air source (not shown) and at predetermined times during the brick handling and stacking operation, air is controlled and directed therethrough by a conventional control valve (not shown) such that air is directed into the inboard bladder 86 of each pusher assembly 76 and 78 simultaneously. It is appreciated that during the inflation of the inboard bladders 86 that the outboard bladders 88 will be collapsed, and, therefore, it is appreciated that the release inlet control sub-assembly 92 would be converted to a conventional control valve such that air can easily and conveniently be exhausted from the outboard bladders 88 when the inboard bladders 86 are being inflated.

Likewise, the outboard bladders 88 will be controlled through the release inlet control sub-assembly 92 which is operative to receive air from an air source (not shown) and to direct the same in appropriate time relationship into the control bladders 88 to cause the pushers 84 to move outwardly and to release any bricks being held therebetween. When the release inlet control sub-assembly 92 is active to direct air therethrough into the outboard bladders 88, it is appreciated that air within the inboard bladders 86 will have to be exhausted, and this can be accomplished through appropriate valving associated with the gripper inlet control sub-assembly 90.

For rotatively driving the entire inverter 60 for inverting bricks received thereby, the rack and pinion rotary drive unit 66 is operatively connected to at least one of the shafts 68 or 70, and wherein the rack and pinion rotary drive unit 66 is actuated in time relationship to the actuation of said elevator assembly 48.

Now turning to FIGS. 2 through 9, the basic method of handling and stacking bricks in accordance with the present invention is illustrated therein. In FIG. 1, two rows of cut brick, $B_1$ and $B_2$, have been advanced from the receiving table 44 onto the elevator assembly 48.

At this point, hydraulic cylinder means 58 is actuated causing the elevator assembly 48 to move from its first position (FIG. 2) upwardly to a second elevated position, as illustrated in FIG. 3. In the second elevated position, the receiving bed 50 of the elevator assembly 48 moves to a position adjacent the lower portion of the inverter 60 such that the two rows of brick $B_1$ and $B_2$ are positioned within the rectangular gripping frame structure of the inverter, and more particulary between the grippers 84. Once the elevator assembly 48 reaches this position, the gripper inlet control sub-assembly 90 of the inverter 60 and associated control valve is actuated, causing the inboard bladders 86 to be inflated which results in the pushers or grippers 84 moving inwardly to grip the two rows of cut brick $B_1$ and $B_2$.

After this, the elevator assembly 48 returns to its first position in alignment with receiving table 44, and once the elevator assembly 48 has returned to this position or is sufficiently clear of the inverter 60, the rotary actuating unit 66 is actuated so as to cause the entire inverter 60 to rotate 180 degrees so as to invert the two rows of brick $B_1$ and $B_2$ so that the upper edge or face of these bricks are now facing downwardly.

In FIG. 4, the inverter 60 has completed its 180 degree rotation and now the continuous advancement of bricks across the receiving table 44 has resulted in two other rows of cut brick, $B_3$ and $B_4$, being received on the bed 50 of the elevator assembly 48. Once the elevator assembly has received these two rows of cut brick $B_3$ and $B_4$, the elevator assembly 48 is actuated to move upwardly towards the inverter 60, as illustrated in FIG. 5. On this cycle of the elevator assembly 48, the stroke of the hydraulic cylinder 58 is limited such that the bed 50 stops in a position where the top of the two brick rows $B_3$ and $B_4$ lies very closely adjacent the single course of bricks being retained and held by the inverter 60. Once the elevator assembly 48 reaches the position shown in FIG. 5, the release inlet control sub-assembly 92 of the inverter and associated valve is actuated, resulting in the outboard bladders 88 being inflated with the inboard bladders 86 being adapted to exhaust air therein, such that the pushers 84 move outwardly with respect to the central stabilizer 80, causing the single course of bricks comprised of the two cut brick rows $B_1$ and $B_2$ to be released from the inverter 60 and to drop onto the single course of bricks, rows $B_3$ and $B_4$, carried by the elevator 48. The release of the two brick rows $B_1$ and $B_2$ is operative to cause hydraulic cylinder means 58 of the elevator assembly 48 to be actuated and to return the elevator assembly 48 to its first position, as illustrated in FIG. 6. At this point, a splitter table 45 disposed to the right of elevator assembly 48, as viewed in FIGS. 1 through 9, is driven towards the left and is stopped closely adjacent the elevator assembly 48, as viewed in FIG. 7. After this, the pusher bar 32 is continuously actuated so as to continue to advance respective brick rows across the receiving table 44, and this results in two other brick rows, $B_5$ and $B_6$, being transferred from the receiving table 44 onto the bed 50 of the elevator assembly 48. The transfer of brick rows $B_5$ and $B_6$ is effective to transfer the double course stack comprised of rows $B_1$, $B_2$, $B_3$ and $B_4$ onto the splitter table, as seen in FIG. 8. Once the double course stack is received on the splitter table 45, the same is actuated to the right so as to provide appropriate clearance for the elevator assembly 48 to continue its transfer and receiving cycles illustrated in FIGS. 2 through 7.

It is appreciated that this handling and stacking operation just discussed, is effective to double course stack with the respective bricks being stacked face to face in preparation for curing and drying. It is important to realize that the cooperation of the inverter 60 and the elevator assembly 48 is effective to take one single course of bricks and to invert the same such that the face edges thereof are inverted 180 degrees, after which the same inverted brick are deposited on a second uninverted single course whose face edges face upwardly, so as to form a two course high stack with the respective brick faces being stacked face to face.

From the foregoing specification and discussion, it is clear that the brick hacking and stacking method and apparatus of the present invention presents a relatively simple, but efficient and effective system for stacking brick after cutting in at least two course high stacks with the individual bricks being stacked face to face. One particular advantage of this basic method as outlined herein, is that the individual bricks can be texturized about their face edges after being cut, but prior to stacking.

The terms "upper", "lower", "forward", "rearward", etc., have been used herein merely for the convenience of the foregoing specification and in the appended claims to describe the method and apparatus for handling and stacking brick and its parts as oriented in the drawings. It is to be understood, however, that these terms are in no way limiting to the invention since the method and apparatus for handling and stacking brick may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A method of handling and stacking brick in at least two high courses with respective faces of the brick being stacked face to face, said method comprising: delivering on an off bearing belt one brick slug after another to a brick cutting assembly disposed adjacent said off bearing belt; pushing each brick slug from said off bearing belt through said brick cutting assembly onto a receiving table so as to cut each individual slug into a plurality of bricks; continuing to push slugs from said off bearing belt through said brick cutting assembly such that accumulated cut brick are advanced across said receiving table; transferring selective brick, one course at a time, from said receiving table to an inverter by sliding cut brick from said receiving table onto an adjacent elevator, moving the elevator upwardly to a position adjacent said inverter where an outer gripping frame of said inverter surrounds the brick on said elevator assembly; closing the outer gripping frame about said brick on said elevator and lowering the elevator from the position adjacent said inverter so as to effectuate the transfer; inverting the selected one course of brick transferred to said inverter by rotating said inverter approximately 180 degrees; transferring the inverted one course of brick from said inverter onto another single course of brick situated on said receiving table so as to form an at least two course high stack of brick with the face edge of the bricks comprising the stack disposed in face to face relationship; and transferring the at least two course high stack of brick from said receiving table to an adjacent area where the stacked brick can be ultimately transferred onto kiln cars.

2. The method of claim 1 wherein the step of transferring the inverted course of brick onto another single course of bricks includes: receiving another single course of uninverted bricks from said receiving table and transferring that single course of bricks upwardly to a position just below the inverted single course of bricks; releasing the inverted single course of bricks from said inverter so as to allow the same to fall onto said uninverted single course of bricks; and then transferring the formed double course stack to where such may ultimately be transferred onto a kiln car.

3. An apparatus for handling and stacking bricks face to face into at least two course high stacks, comprising: a main frame structure; an off bearing belt having a portion extending adjacent said main frame structure and adapted to receive slugs of brick material and to transfer the same to a discharge area; a brick cutting assembly mounted adjacent said discharge area; pusher means reciprocally mounted adjacent said discharge area for pushing respective slugs from said off bearing belt through said brick cutting assembly so as to cut the brick slugs into a plurality of bricks; a receiving table mounted adjacent said brick cutting assembly and supported by said main frame structure for receiving the cut brick pushed through said brick cutting assembly; elevating means mounted adjacent said receiving table and movable between a first position adjacent said receiving table, where cut bricks can be pushed directly from said receiving table onto said elevator means, to a second elevated position; and an inverter rotatively mounted above said elevating means and cooperative therewith and including a gripping frame structure for gripping and holding bricks, said inverter spaced such that when said elevating means assumes said elevated position, said gripping frame structure surrounds bricks carried by said elevating means; means associated with said inverter for actuating and deactuating said gripping frame structure in time relationship to the movement of said elevating means, said actuating and deactuating means adapted to actuate said gripping frame structure on one cycle of the elevating means so as to grip the bricks carried thereon and to effectively transfer bricks from said elevating means to said inverter, while on every other cycle said actuating and deactuating means is adapted to deactuate said gripper frame structure to effectively release bricks carried thereby onto other bricks carried on said elevating means; and rotary drive means for rotating said inverter 180 degrees after each transfer of bricks thereto in order to invert the faces thereof such that the bricks held by the inverter can be deposited on another course of bricks carried on said elevating means so as to form a two course high stack of bricks with the respective faces of the bricks being stacked face to face.

4. The apparatus for handling and stacking brick of claim 3 wherein the same is provided with splitter table means mounted adjacent said elevating means opposite said receiving table, said splitter table means movable between a position closely adjacent said receiving table for receiving a two course high stack of brick therefrom and a position spaced from said elevating means.

5. The brick handling and stacking apparatus of claim 4 including an accumulating table disposed adjacent said splitter table means opposite said elevating means for receiving bricks from said splitter table means when said splitter table means occupies a position space from said elevating means.

6. The brick hacking and stacking apparatus of claim 3 wherein said gripping frame structure of said inverter is generally rectangularly shaped and includes two opposed grippers that co-act to hold and retain bricks therebetween with a squeezing action.

7. The brick handling and stacking apparatus of claim 6 wherein said inverter is supported by a pair of laterally spaced upright support posts that are supported by the main frame structure of said brick handling and stacking apparatus.

8. The brick handling and stacking apparatus of claim 7 wherein said elevating means comprises: a generally flat receiving bed; a vertical support member secured to said receiving bed and extending downwardly therefrom; guide arm link means pivotably connected between said main frame structure and said vertical support post for guiding said elevating means up and down between said first and second elevated positions; and hydraulic cylinder means operatively connected to said elevating means for actuating the same for movement between said first and second elevated positions.

9. A brick handling and stacking apparatus with inversion and double course stacking capability after hacking, said apparatus comprising: a main frame structure; a brick cutting assembly mounted on said main frame structure; an off bearing belt associated with said main frame structure for delivering brick slugs to a discharge area adjacent said brick cutting assembly; pusher means for pushing respective brick slugs from said off bearing belt through said brick cutting assembly; a receiving table disposed adjacent said brick cutting assembly and adapted to receive cut bricks passing from said brick cutting assembly; means disposed adjacent said receiving table for receiving a selected course of cut bricks thereon and transferring the course of brick from said receiving table; means for receiving the selected course of brick transferred from said receiving table and for inverting the received course of bricks by rotating the same 180 degrees, and then depositing the inverted course of bricks on another uninverted course of bricks to form a two course high stack of bricks with the respective faces of the brick being stacked in face to face relationship and wherein said means for receiving the selected course of brick and inverting the same comprises a rotary mounted and driven inverter disposed above the level of said receiving table and including a gripping frame structure that is generally rectangularly shaped and adapted to receive and retain bricks therein; and wherein said means for receiving bricks from said receiving table and transferring them therefrom comprises an elevator assembly disposed adjacent one end of said receiving table and generally below said inverter and wherein said elevator assembly includes a receiving bed that is adapted to receive bricks from said receiving table in a first position generally aligned with and adjacent said receiving table and wherein said receiving bed is adapted to move between said first position and a second elevated position just below said inverter where the rectangularly shaped gripper frame structure thereof surrounds the brick supported about said receiving bed thereof.

* * * * *